United States Patent
Chen et al.

(10) Patent No.: US 11,070,615 B2
(45) Date of Patent: Jul. 20, 2021

(54) METHOD, DEVICE AND COMPUTER PROGRAM PRODUCT FOR TRANSACTION NEGOTIATION

(71) Applicant: EMC IP Holding Company LLC, Hopkinton, MA (US)

(72) Inventors: Fei Chen, Beijing (CN); Fucai Liu, Beijing (CN); Kun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/362,216

(22) Filed: Mar. 22, 2019

(65) Prior Publication Data
US 2019/0387052 A1 Dec. 19, 2019

(30) Foreign Application Priority Data
Jun. 15, 2018 (CN) .......................... 201810621964.6

(51) Int. Cl.
*H04L 29/08* (2006.01)
*G06F 9/46* (2006.01)

(52) U.S. Cl.
CPC .......... *H04L 67/1025* (2013.01); *G06F 9/466* (2013.01); *H04L 67/10* (2013.01)

(58) Field of Classification Search
CPC ...... H04L 67/10; H04L 67/1025; G06F 13/12
See application file for complete search history.

(56) References Cited

U.S. PATENT DOCUMENTS

| | | | |
|---|---|---|---|
| 7,290,056 B1* | 10/2007 | McLaughlin, Jr. | ........................ H04L 43/0852 709/201 |
| 2004/0083186 A1* | 4/2004 | Castellani | .............. G06Q 10/10 705/80 |
| 2005/0013294 A1* | 1/2005 | Cypher | ............... G06F 12/0817 370/389 |
| 2014/0201463 A1* | 7/2014 | Blankenship | ....... G06F 12/0815 711/143 |
| 2015/0006749 A1* | 1/2015 | Hendel | ................... H04L 47/34 709/230 |

(Continued)

OTHER PUBLICATIONS

Wikipedia, "Paxos (computer science)," Wikipedia, Jun. 11, 2018. [Online], Available: https://en.wikipedia.org/w/index.php?title=Paxos_%28computer_science%29oldid=845334764. [Accessed: Jun. 3, 2021] (Year: 2018).*

*Primary Examiner* — Thomas J Dailey
(74) *Attorney, Agent, or Firm* — Ryan, Mason & Lewis, LLP (57) ABSTRACT

Embodiments of the present disclosure relate to a method, a device and a computer program product for negotiating a transaction. The method of negotiating the transaction comprises: receiving, from a server, entity information for negotiation, the entity information indicating an entity that is applicable to negotiate a transaction; determining at least one entity based on the entity information; in response to receiving a negotiation request for a transaction associated with a distributed application, negotiating, with respect to the transaction with the at least one entity to obtain transaction negotiation information, the transaction negotiation information comprises coherency that is reached, with respect to the transaction, with the at least one entity; and sending the transaction negotiation information to the server.

20 Claims, 9 Drawing Sheets

(56) References Cited

U.S. PATENT DOCUMENTS

| | | | |
|---|---|---|---|
| 2015/0074168 A1* | 3/2015 | Hartman | G06F 16/182 709/201 |
| 2016/0191622 A1* | 6/2016 | Aahlad | H04L 67/40 709/201 |
| 2019/0095804 A1* | 3/2019 | Mukherjea | G06N 20/00 |

* cited by examiner

METHOD, DEVICE AND COMPUTER PROGRAM PRODUCT FOR TRANSACTION NEGOTIATION

RELATED APPLICATION(S)

The present application claims priority to Chinese Patent Application No. 201810621964.6, filed Jun. 15, 2018, and entitled "Method, Device and Computer Program Product for Transaction Negotiation," which is incorporated by reference herein in its entirety.

FIELD

Embodiments of the present disclosure generally relate to the field of distributed applications, and more specifically, to a method, a device and a computer program product for negotiating a transaction.

BACKGROUND

There are many different types of existing distributed applications. The distributed applications run on many servers, working tightly with connections of a network. Coherency is one of the most important problems for the distributed applications to maintain the correctness of behavior of the applications.

To obtain a coherent result, the applications on all servers negotiate with each other through the network, and finally confirm a same result. For example, the Paxos algorithm is one of the most important negotiation algorithms which is used for the negotiation among multiple participators.

However, because the negotiation is performed through the network and sometimes involves several network round trips, it is sensitive to network latency and a central processing unit (CPU) cycle is needed to handle network traffic. Therefore, the negotiation will increase latency for processing distributed applications, and aggravate the burden on the CPU, thereby affecting user experience.

SUMMARY

Embodiments of the present disclosure provide a method, a device and a computer program product for negotiating a transaction.

In a first aspect of the present disclosure, a method for transaction negotiation is provided. The method comprises: receiving, from a server, entity information for negotiation, the entity information indicating an entity that is applicable to negotiate a transaction; determining at least one entity based on the entity information; in response to receiving a negotiation request for a transaction associated with a distributed application, negotiating, with respect to the transaction, with the at least one entity to obtain transaction negotiation information, the transaction negotiation information comprising coherency that is reached, with respect to the transaction, with the at least one entity; and sending the transaction negotiation information to the server.

In a second aspect of the present disclosure, a method for transaction negotiation is provided. The method comprises: sending entity information for negotiation to a network adapter, the entity information indicating an entity that is applicable to negotiate a transaction; and receiving, from the network adapter, transaction negotiation information, the transaction negotiation information comprising coherency that is reached, with respect to a transaction, by the network adapter with at least one entity that is determined based on the entity information.

In a third aspect of the present disclosure, a device for transaction negotiation is provided. The device comprises: at least one processing unit; at least one memory, coupled to the at least one processing unit and storing instructions executed by the at least one processing unit, the instructions, when executed by the at least one processing unit, causing the device to perform acts, including: receiving, from a server, entity information for negotiation, the entity information indicating an entity that is applicable to negotiate a transaction; determining at least one entity based on the entity information; in response to receiving a negotiation request for a transaction associated with a distributed application, negotiating, with respect to the transaction with the at least one entity to obtain transaction negotiation information, the transaction negotiation information comprising coherency that is reached, with respect to the transaction, with the at least one entity; and sending the transaction negotiation information to the server.

In a fourth aspect of the present disclosure, a device for transaction negotiation is provided. The device comprises: at least one processing unit; at least one memory, coupled to the at least one processing unit and storing instructions executed by the at least one processing unit, the instructions, when executed by the at least one processing unit, causing the device to perform acts, including: sending entity information for negotiation to a network adapter, the entity information indicating an entity that is applicable to negotiate a transaction; and receiving, from the network adapter, transaction negotiation information, the transaction negotiation information comprising coherency that is reached, with respect to a transaction, by the network adapter with at least one entity that is determined based on the entity information.

In a fifth aspect of the present disclosure, a computer program product is provided. The computer program product is tangibly stored on a non-transient computer readable medium and comprises machine executable instructions which, when being executed, cause the machine to execute any step of a method according to the first aspect of the present disclosure.

In a sixth aspect of the present disclosure, a computer program product is provided. The computer program product is tangibly stored on a non-transient computer readable medium and comprises machine executable instructions which, when being executed, cause the machine to execute any step of a method according to the second aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the more detailed description of example embodiments of the present disclosure with reference to the accompanying drawings, the above and other objects, features and advantages of the present disclosure will become more apparent, wherein the same reference numerals typically represent the same components in the example embodiments of the present disclosure.

Throughout the figures, the same or corresponding numerals denote the same or corresponding parts.

DETAILED DESCRIPTION

The preferred embodiments of the present disclosure will be described in more detail with reference to the drawings. Although the preferred embodiments of the present disclosure are illustrated in the drawings, it should be understood that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "comprises" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "another embodiment" is to be read as "at least one another embodiment." The terms "first," "second" and so on can refer to same or different objects. The following text can also include other explicit and implicit definitions.

Figure 1:
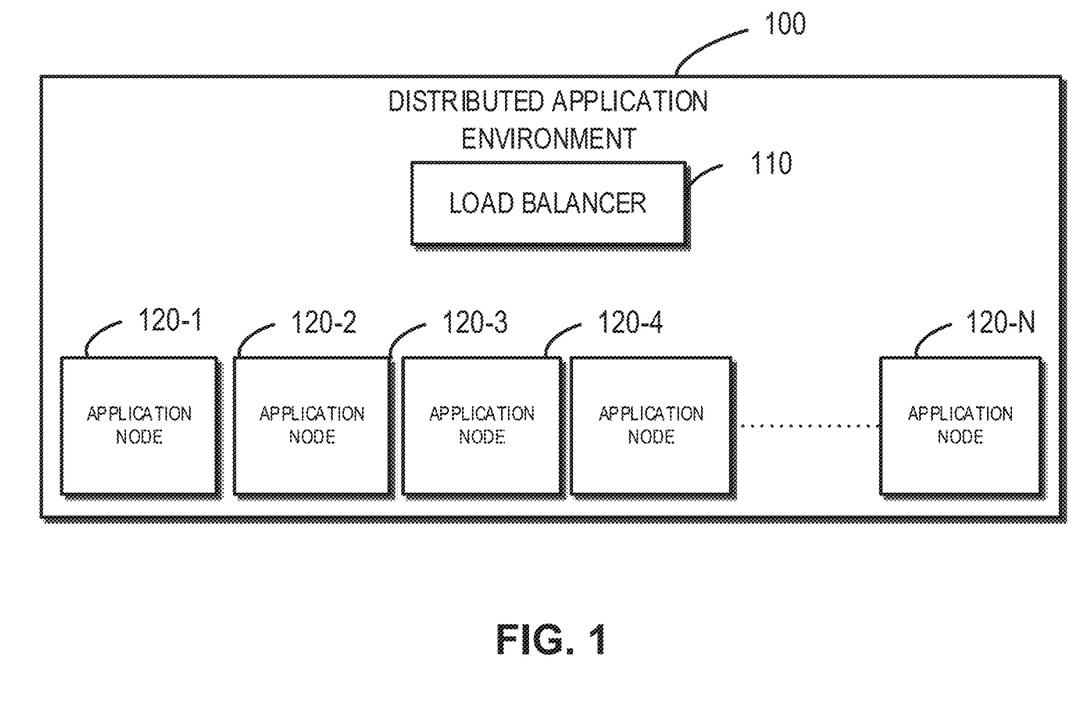
FIG. 1 shows a schematic view of a distributed application environment 100 according to embodiments of the present disclosure.

FIG. 1 shows a schematic view of a distributed application environment 100 according to embodiments of the present disclosure. As depicted in FIG. 1, the distributed application environment 100 comprises a load balancer 110 and N application nodes 120-1 to 120-N (collectively referred to as an application node(s) 120). The load balancer 110 is used for allocating use requests for distributed applications to different application nodes 120. The application node 120 is used for executing distributed applications in response to the load balancer 110 allocating use requests, wherein the application node may further comprise a server and a network adapter.

As described in the Background, when servers on application nodes negotiate with each other through a network in order to get a coherent result, the negotiation will increase latency for processing distributed applications, aggravate the burden on a CPU and thereby affect the user experience.

Figure 2:
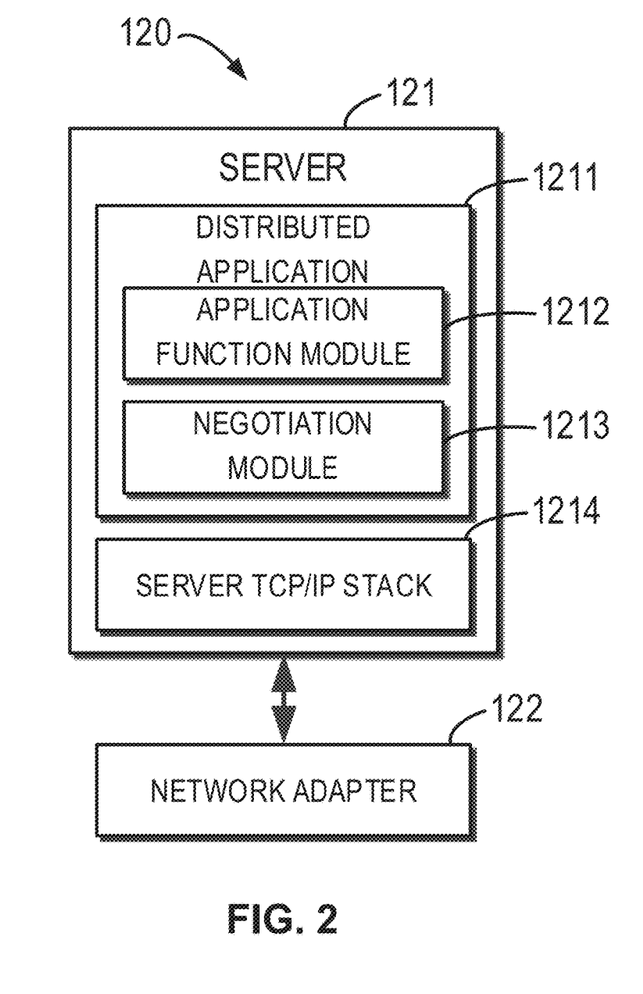
FIG. 2 shows a schematic view of an application node 120 in a traditional solution.

Specifically, FIG. 2 shows a schematic view of an application node 120 in traditional solutions. As depicted in FIG. 2, the application node 120 in traditional solutions comprises a server 121 and a network adapter 122. The server 121 further comprises a distributed application 1211 and a server Transmission Control Protocol/Internet Protocol (TCP/IP) stack 1214, and the distributed application 1211 further comprises an application function module 1212 and a negotiation module 1213.

In the application node 120 in traditional solutions, the network adapter 122 only has the function of transmitting data with the server 121 and other network entity (e.g., a node) through the server TCP/IP stack 1214 on the server 121 for example, without a storage function or operation negotiation function. In the application node 120 in traditional solutions, the distributed application 1211 on the server 121 comprises the application function module 1212 providing various functions of distributed applications and the negotiation module 1213 for negotiating with other network entities. Various negotiation algorithms such as Paxos may be used in the negotiation module 1213.

In traditional solutions, when all servers negotiate with each other in order to get a coherent result of a distributed application, the negotiation module 1213 on the server 121 has to negotiate with other servers for several round trips. Specifically, the negotiation module 1213 needs to send and receive messages to and from other servers, trying to reach a coherent result which can be accepted by all servers (that is, negotiation participants of the distributed application 1211). After a coherent result is reached among all servers, the distributed application 1211 may process data involved in the coherent result according to the reached coherent result.

Since the negotiation module 1213 is included in the server 121 and the server 121 needs to communicate with other servers through the network adapter 122, the server TCP/IP stack 1214 on the server 121 will be used multiple times. Meanwhile, since the negotiation involves communication between the server 121 and the network adapter 122, a longer network path will result. Therefore, the negotiation in traditional solutions will increase latency for processing distributed applications, and aggravate the burden on the CPU, thereby affecting the user experience.

To at least partially overcome the foregoing problems in traditional solutions, embodiments of the present disclosure provide a solution for negotiating a transaction. The solution aims to offload the negotiation module 1213 and the negotiation algorithms used by the same into a network adapter with a processing ability, for example using in the network adaptor an embedded processor having such a processing ability, while keeping the distributed application running in a server (e.g., an X86 host).

The foregoing solution according to embodiments of the present disclosure leverages a current network adapter which has an embedded processor, and such a network adapter is sometimes called a smart network adapter or a smart Network Interface Card (NIC). The smart NIC can not only process network traffic like forwarding network packets to and from a server but also run a user's software (e.g., Linux) on the smart NIC. Therefore, the smart NIC allows a user to put part of the computation on a network path between the server and another entity, thereby enabling the handling of network traffic prior to the server.

With the technical solution in illustrative embodiments of the present disclosure, not only network latency and latency of distributed application during transaction negotiation can be reduced, but also the processing burden on a CPU can be saved, and further the processing of other network traffic can be accelerated.

Figure 3:
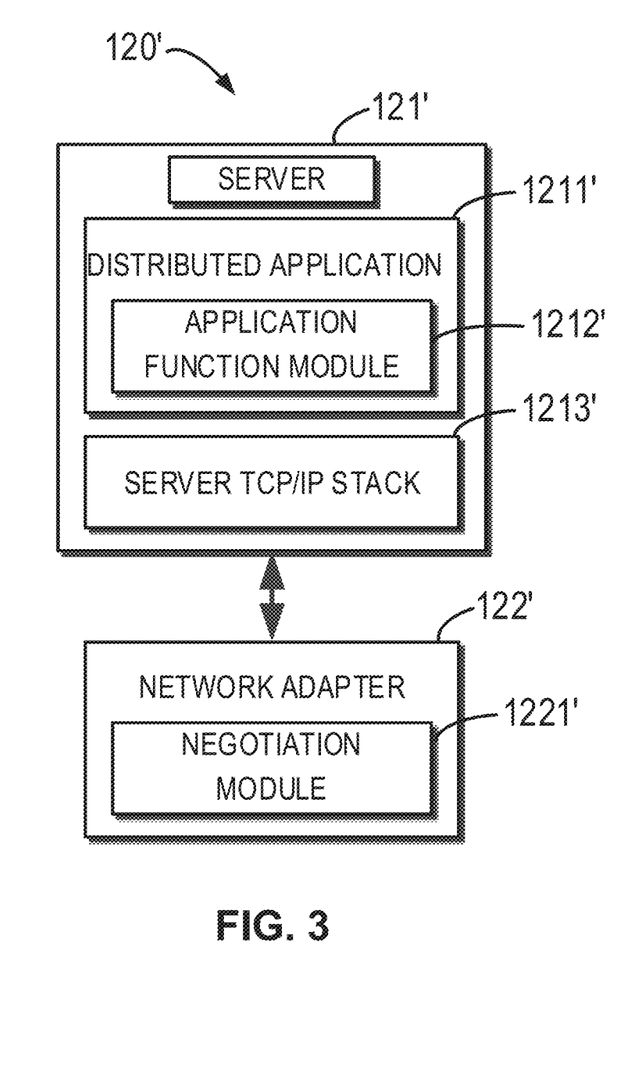
FIG. 3 shows a schematic view of an application node 120' according to embodiments of the present disclosure.

FIG. 3 shows a schematic view of an application node 120' according to embodiments of the present disclosure. As depicted, the application node 120' according to the embodiments of the present disclosure comprises a server 121' and a network adapter 122'. The server 121' further comprises a distributed application 1211' and a server TCP/IP stack 1213', and the distributed application 1211' further comprises an application function module 1212'. The network adapter 122' further comprises a negotiation module 1221'.

Unlike the traditional solution shown in FIG. 2 in which the negotiation module 1213 is included in the server 121, in the application node 120' according to the embodiments of the present disclosure, the negotiation module 1221' is included in the network adapter 122'. Since in the distributed application 1211' the application function module 1212' resides on the server 121' while the negotiation module 1221' resides on the network adapter 122', the application function module 1212' may leverage function calls to use functions of the negotiation module 1221'. The calls and other communication between the application function module 1212' and the negotiation module 1221' may be implemented through a peripheral component interconnect express (PCIe) physical link between the server 121' and the network adapter 122'. For the negotiation module 1221', since the network adapter 122' has a computing ability, the negotiation module 1221' may negotiate with another network entity directly and only needs to communicate with the server 121' in particular situations (e.g., when the negotiation module 1221' is initialized, status data generated during negotiation is stored to the server 121', and a result of the negotiation is sent to the server 121', etc.).

Figure 4:
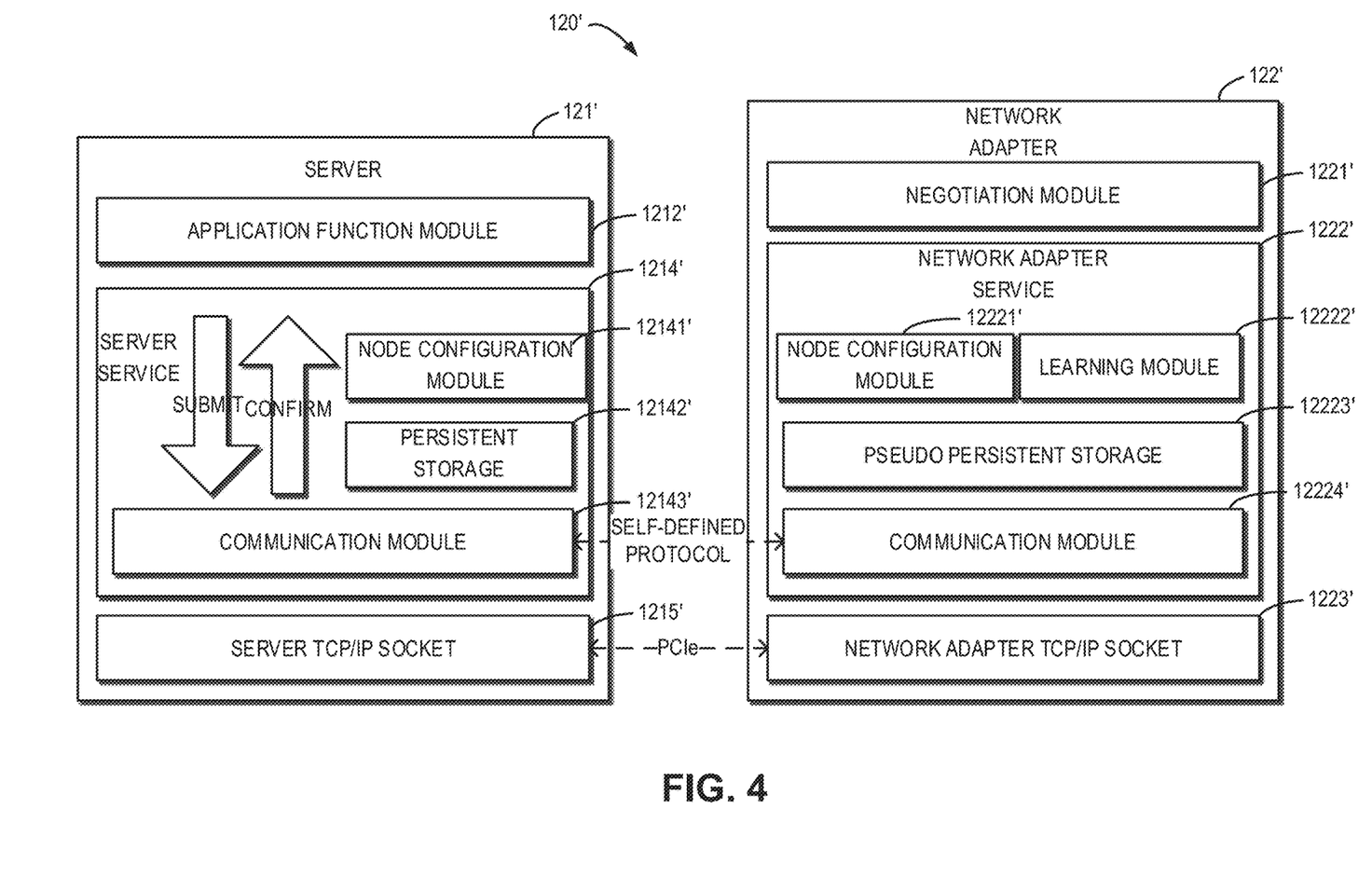
FIG. 4 shows a schematic view of an application node 120' according to other embodiments of the present disclosure.

FIG. 4 shows a schematic view of an application node 120' according to other embodiments of the present disclosure. As depicted, the application node 120' according to other embodiments of the present disclosure comprises a server 121' and a network adapter 122'.

The server 121' comprises an application function module 1212', a server service 1214' and a server TCP/IP socket 1215'. The server service 1214' further comprises a node configuration module 12141', a persistent storage 12142' and a communication module 12143'. As shown by two arrows of the server service 1214', the application function module 1212' may submit a negotiation request for a transaction associated with a distributed browser to the communication module 12143' in the server service 1214', and may receive from the communication module 12143' a confirmation of the negotiation request, that is, a coherent result is reached between the network adapter 122' and another entity (e.g., another server or network adapter also have a processing ability).

The network adapter 122' comprises a negotiation module 1221', a network adapter service 1222' and a network adapter TCP/IP socket 1223'. The network adapter service 1222' further comprises a node configuration module 12221', a learning module 12222', a pseudo persistent storage 12223' and a communication module 12224'.

Functions of the application function module 1212' and the negotiation module 1221' in FIG. 4 are substantially the same as those of the application function module 1212' and the negotiation module 1221' in FIG. 3, which are not detailed here.

The node configuration modules 12141' and 12221' respectively in the server 121' and the network adapter 122' in FIG. 4 are used for storing configuration information, which comprises, for example, entity information for negotiation. The entity information may indicate an entity that is applicable to negotiate a transaction. Specifically, the configuration information may describe information about the application node 120 in the distributed application environment 100, such as an IP address of each entity (e.g., the network adapter or server). Such information is originally stored in the node configuration module 12141' in the server 121'. Since the negotiation module 1221' needs the information to negotiate with another entity, there may be corresponding logic existing so as to copy the information from the node configuration module 12141' to the node configuration module 12221'. Such copying may be implemented through communication between the communication module 12143' and the communication module 12224'.

The persistent storage 12142' and the pseudo persistent storage 12223' are used for storing status data related to negotiation of the transaction. Usually the status data is generated during negotiation and needs to be stored, and more particularly stored in a persistent storage, so that if an entity (the network adapter 122' in this embodiment) carrying the negotiation module 1221' fails (e.g., crashes or is down), the entity may read the stored status data from the persistent storage to recover to a normal status.

Since usually there is no persistent storage but only a nonpersistent storage (e.g., a random access memory RAM) in the network adapter 122', the nonpersistent storage in the network adapter 122' may be used to form a pseudo persistent storage 12223' for temporarily storing the status data. At this point, since the status data may be stored in the pseudo persistent storage 12223', the negotiation module 1221' may work normally. However, since the status data is stored in the pseudo persistent storage 12223', if the network adapter 122' is powered off, then the status data will be lost. Therefore, there is a need for a corresponding logic to periodically copy the status data in the pseudo persistent storage 12223' to the persistent storage 12142'. At this point, if the network adapter 122' is powered off, the status data may be copied from the persistent storage 12142' back to the pseudo persistent storage 12223'. The copy may also be implemented through communication between the communication modules 12143' and 12224'.

The communication modules 12143' and 12224' may be used for implementing communication and data transmission between the server 121' and the network adapter 122'. Since the application function module 1212' and the negotiation module 1221' reside on different entities (the server 121' and the network adapter 122' respectively), the application function module 1212' cannot directly call functions of the negotiation module 1221' through function calls. Such a problem is solved by the communication modules 12143' and 12224'. Since there is a natural TCP/IP network traffic between the server 121' and the network adapter 122', the communication modules 12143' and 12224' may be built based on the existing TCP/IP network stack for communication between the application function module 1212' and the negotiation module 1221'. In the meantime, a self-defined protocol may be designed based on the TCP/IP. The communication modules 12143' and 12224' may expose a function call interface to the distributed application to allow the distributed application to submit data and get the confirmation as to whether the submitted data are accepted by all participators.

The server TCP/IP socket 1215' and the network adapter TCP/IP socket 1223' are used for supporting communication and data transmission through the PCIe physical link between the server 121' and the network adapter 122'.

The learning module 12222' is used for, when the negotiation module 1221' negotiates with another entity, getting (learning) a result of negotiation between participators and sending to the server 121' the result of negotiation in a form of a message.

As can be seen by comparing FIG. 3 with FIG. 4, although they respectively show schematic views of the application nodes 120' according to different embodiments of the present disclosure, the application nodes 120' as depicted contain uniformity, and the application node 120' shown in FIG. 4 may be construed as a refinement of the application node 120' in FIG. 3.

Figure 5:
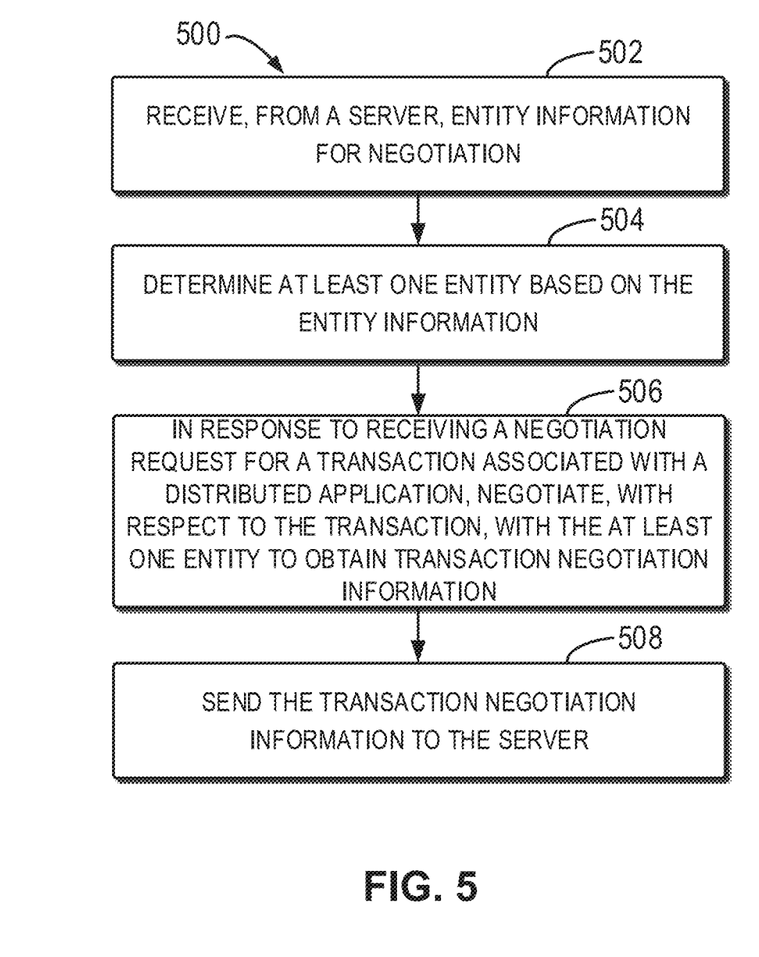
FIG. 5 shows a flowchart of a method 500 of negotiating a transaction according to embodiments of the present disclosure.
Figure 6:
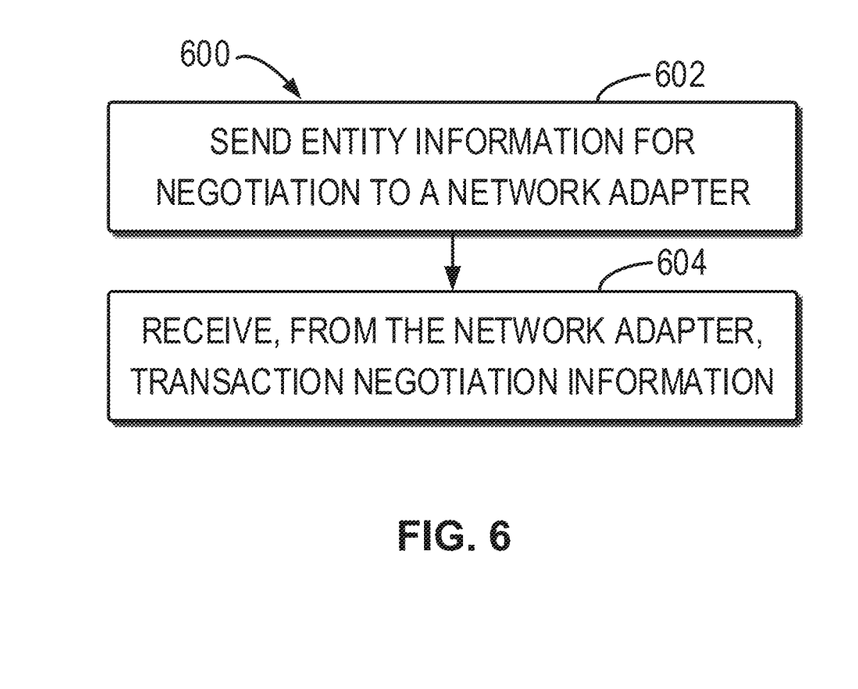
FIG. 6 shows a flowchart of a method 600 of negotiating a transaction according to embodiments of the present disclosure.
Figure 7:
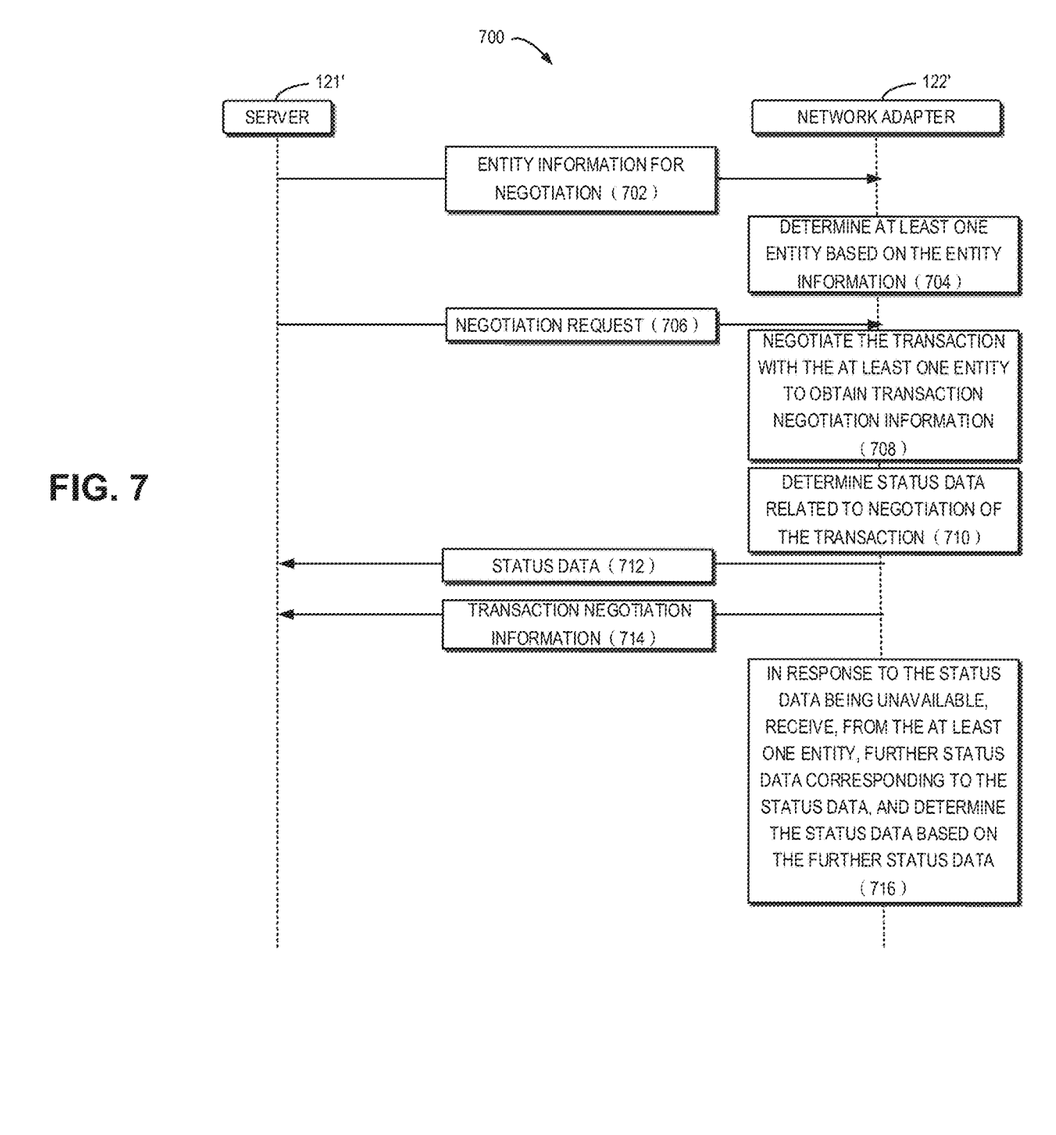
FIG. 7 shows a schematic view of an operation flow 700 of interactions between a server and a network adapter according to embodiments of the present disclosure.

As description has been presented to schematic views of the application nodes 120' according to the embodiments of the present disclosure with reference to FIGS. 3 and 4, now concrete flows and operations of methods 500 and 600 for transaction negotiation as well as an operation flow 700 of interaction between a server and a network adapter will be described in detail below according to embodiments of the present disclosure with reference to FIGS. 5 to 7. Specifically, FIGS. 5 to 7 are depicted with reference to the application node 120' shown in FIGS. 3 and 4, wherein the application node 120' may comprise a server 121' and a network adapter 122'. Since function distribution and execution of corresponding modules in the server 121' and the network adapter 122' will not affect the implementation of embodiments of the present disclosure, description is presented below only from the perspective of the server 121' and the network adapter 122' for FIGS. 5 to 7. It should be understood that the flows and operations to be described below may further comprise one or more additional steps and operations which are not shown and/or omit one or more steps and operations which are shown, and the scope of the present disclosure is not limited in this regard.

FIG. 5 shows a flowchart of a method 500 for transaction negotiation according to embodiments of the present disclosure. Specifically, the method 500 may be executed by the network adapter 122' or other appropriate device. It should be understood the method 500 may further comprise an additional step which is not shown and/or omit a step which is shown, and the scope of the present disclosure is not limited in this regard.

At block 502, the network adapter 122' receives from the server 121' entity information for negotiation, the entity information indicating an entity that is applicable to negotiate a transaction. According to the embodiments of the present disclosure, the entity information may be configuration information described with reference to FIG. 4, via which the network adapter 122' may know with which entities it may negotiate for a transaction associated with a distributed application.

The block 502 essentially reflects an initialization step, because the entity information is not stored in the network adapter 122' originally. According to the embodiments of the present disclosure, the block 502 may further comprise other initialization steps.

First of all, after the application node 120' is powered on, the network adapter 122' is also powered on. At this point, the network adapter 122' may listen on a port which is used by the server 121' to send data including entity information to the network adapter 122' through standard TCP/IP, e.g., by monitoring a corresponding IP address. Normally objects being monitored may be a gateway IP address and a predefined port. Because all network traffic from the server 121' is processed by the network adapter 122', the network adapter 122' can easily intercept data going to the network adapter 122' from the server 121' by monitoring the IP address and predefined port.

After various applications on the server 121' are launched, the distributed application 1211' is also launched. At this point, the distributed application 1211' may also listen on the IP address and predefined port mentioned above. In this way, when the network adapter 122' wants to send data to the distributed application 1211' on the server 121', the distributed application 1211' may easily receive, by listening on the IP address and predefined port mentioned above, network packets which are sent by the network adapter 122' through the standard TCP/IP address.

After both the server 121' and the network adapter 122' are launched, in particular, after both the server service 1214' and the network adapter service 1222' described with reference to FIG. 4 are launched, the server 121' sends the entity information to the network adapter service 1222' by using the node configuration modules 12141' and 12221' through the IP address and predefined port mentioned above, that is, the step described in the block 502.

Still with reference to FIG. 5, at block 504, the network adapter 122' determines at least one entity based on the entity information. According to embodiments of the present disclosure, the determined at least one entity may be another server or network adapter with a negotiation ability.

At block 506, in response to receiving a negotiation request for a transaction associated with a distributed application, the network adapter 122' negotiates, with respect to the transaction, with the at least one entity to obtain transaction negotiation information, which comprises coherency that is reached, with respect to transaction, with the at least one entity. According to the embodiments of the present disclosure, the transaction refers to content which needs to be negotiated between multiple entities about the distributed application 1211'. According to embodiments of the present disclosure, when the negotiation is initiated by the server 121', the network adapter 122' receives the negotiation request from the server 121', and when the negotiation is initiated by another entity, the network adapter 122' receives the negotiation request from the entity that initiates the negotiation.

According to embodiments of the present disclosure, when the server 121' initiates negotiation, the server 121' sends corresponding data to the communication module 12143', and then the communication module 12143' sends the data to the communication module 12224' through the IP address and predefined port mentioned before. After receiving the data, the communication module 12224' forwards the data to the negotiation module 1221'.

According to the embodiments of the present disclosure, when the network adapter 122' negotiates with the at least one entity, corresponding status data will be generated. The network adapter 122' stores the status data in the pseudo persistent storage 12223' and periodically sends the status data to the persistent storage 12142' on the server 121'.

According to embodiments of the present disclosure, it is possible that the network adapter 122' is powered off before periodically sending the status data to the persistent storage 12142' on the server 121'. At this point, since the status data has not been sent to the persistent storage 12142', the status data cannot be recovered from the network adapter 122' or the server 121' (that is, the status data is unavailable at the application node 120'). Since the negotiation is implemented on a peer to peer basis and the distributed application is based on a coherent system, that is, the negotiation must take place between the network adapter 122' and another entity, the network adapter 122' may receive status data corresponding to locally unavailable status data from the other entity by using the negotiation module 1221', and obtain status data which is lost in power off through the corresponding status data. It should be understood this process needs to be carried out for a long time and is a safeguarding function.

Still referring to FIG. 5, at block 508, the network adapter 122' sends the transaction negotiation information obtained at the block 506 to the server 121'. According to the embodiments of the present disclosure, the learning module 12222' may communicate with the negotiation module 1221' to learn all results of the negotiation, and send the final transaction negotiation information to the server 121' through the communication modules 12224' and 12143'.

The flow of the method for transaction negotiation was described from the perspective of the network adapter 122' with reference to FIG. 5. It should be understood that providing the description from the perspective of the network adapter 122' is intended to better present content of the present disclosure, and should not be construed as limiting in any manner.

FIG. 6 shows a flowchart of a method 600 for transaction negotiation according to embodiments of the present disclosure. Specifically, the method 600 may be executed by the server 121' or other appropriate device. It should be understood the method 600 may further comprise an additional step which is not shown and/or omit a step which is shown, and the scope of the present disclosure is not limited in this regard.

At block 602, the server 121' sends to the network adapter 122' entity information for negotiation, the entity information indicating an entity that is applicable to negotiate a transaction. The concrete operation at the block 602 corresponds to that described with reference to the block 502 in FIG. 5 and thus is not detailed here.

According to embodiments of the present disclosure, when negotiation is initiated by the server 121', the block 602 may further comprise the server 121' sending a negotiation request to the network adapter 122'.

At block 604, the server 121' receives transaction negotiation information from the network adapter 122', the transaction negotiation information comprising coherency that is reached, with respect to a transaction, by the network adapter 122' with at least one entity that is determined based on the entity information. The concrete operation at the block 604 corresponds to those described with reference to the blocks 504, 506 and 508 in FIG. 5 and thus is not detailed here.

According to embodiments of the present disclosure, the block 604 may further comprise the server 121' receiving the network adapter 122' status data related to negotiation of the transaction that is determined by the network adapter 122'.

The flow of the method 600 for transaction negotiation has been described from the perspective of the server 121' with reference to FIG. 6. It should be understood that providing the description from the perspective of the server 121' is intended to better present content of the present disclosure, and should not be construed as limiting in any manner.

FIG. 7 shows a schematic view of an operation flow 700 of interactions between a server and a network adapter according to embodiments of the present disclosure. With reference to FIG. 7, the methods 500 and 600 for transaction negotiation in the present disclosure will be described in more detail.

At block 702, entity information for negotiation being sent from the server 121' to the network adapter 122' is illustrated. The concrete operation at the block 702 corresponds to those described with reference to the blocks 502 and 602 in FIGS. 5 and 6, thus is not detailed here. At block 704, the network adapter 122' determines at least one entity based on the entity information. The concrete operation at block 704 corresponds to that described with reference to the block 504 in FIG. 5, thus is not detailed here.

At block 706, the server 121' sends a negotiation request to the network adapter 122'. According to other embodiments of the present disclosure, the negotiation request may also be sent by another entity to the network adapter 122', and the protection scope of the present disclosure is not limited in this regard. The concrete operation at the block 706 corresponds to those described with reference to FIGS. 5 and 6, thus is not detailed here.

At block 708, the network adapter 122' negotiates a transaction with the at least one entity to obtain transaction negotiation information. The concrete operation at the block 708 corresponds to that described with reference to the block 506 in FIG. 5, thus is not detailed here.

At block 710, the network adapter 122' determines status data related to negotiation of the transaction. The concrete operation at the block 710 corresponds to those described with reference to FIGS. 5 and 6, thus is not detailed here.

At block 712, the network adapter 122' sends the status data to the server 121'. The concrete operation at block 712 corresponds to those described with reference to FIGS. 5 and 6, thus is not detailed here.

At block 714, the network adapter 122' sends the transaction negotiation information to the server 121'. The concrete operation at the block 714 corresponds to those described with reference to blocks 508 and 604 in FIGS. 5 and 6, thus is not detailed here.

At block 716, in response to the status data being unavailable, the network adapter 122' receives, from the at least one entity, further status data corresponding to the status data, and determines status data based on the further status data. The concrete operation at block 716 corresponds to those described with reference to FIG. 5, thus is not detailed here.

Figure 8:
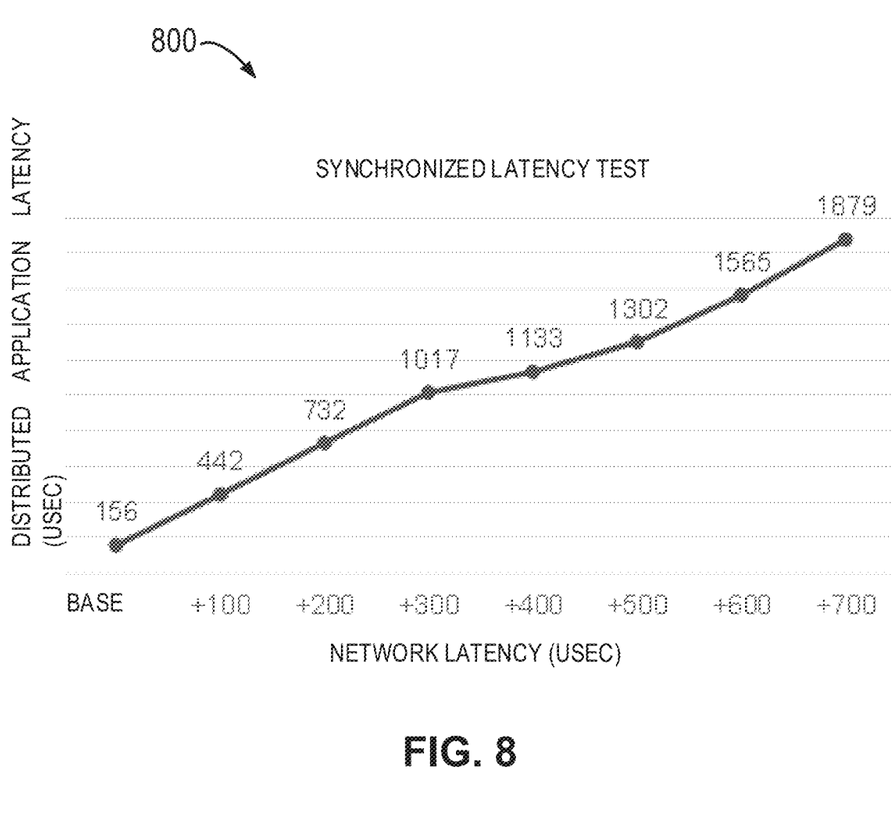
FIG. 8 shows a relational view 800 between network latency and latency of distributed application according to embodiments of the present disclosure.

FIG. 8 shows a relational view 800 between network latency and latency of a distributed application according to embodiments of the present disclosure. The relational view shown in FIG. 8 is a relational view where a user of the distributed application 1211 submits data of 50 bytes and there are three application nodes 120. The horizontal axis in FIG. 8 is network latency by the unit of microseconds, and the vertical axis is the latency of a distributed application by the unit of microseconds. As can be seen from FIG. 8, distributed application latency increases substantially linearly with the increase of network latency. Therefore, when the network latency decreases, the latency of a distributed application may decrease significantly. Through further testing, with the solution for transaction negotiation according to the embodiments of the present disclosure, network latency may be reduced by ⅓, thereby greatly reducing the latency of the distributed application.

As can be seen from the description with reference to FIGS. 1 to 8, compared with the traditional solution, there are many advantages in the technical solution according to embodiments of the present disclosure. With the technical solution according to the embodiments of the present disclosure, the following problems can be overcome: increasing processing latency for processing the distributed application, aggravating burden on CPU and further affecting user experience because the server TCP/IP stack 1214 in the server 121 will be used many times and the negotiation process involves a longer network path of communication between the server 121 and the network adapter 122. In comparison, the technical solution according to the embodiments of the present disclosure makes it possible that the network adapter 122' and its negotiation module 1221' do not have to communicate with the server 121' many times, as such, the use of the server TCP/IP socket 1215' can be reduced and the network path for negotiation is made shorter. Therefore, with the technical solution provided by embodiments of the present disclosure, not only the network latency and the latency of distributed application during transaction negotiation can be reduced, but also the processing burden on CPU can be saved and further the processing of other network traffic can be accelerated.

Figure 9:
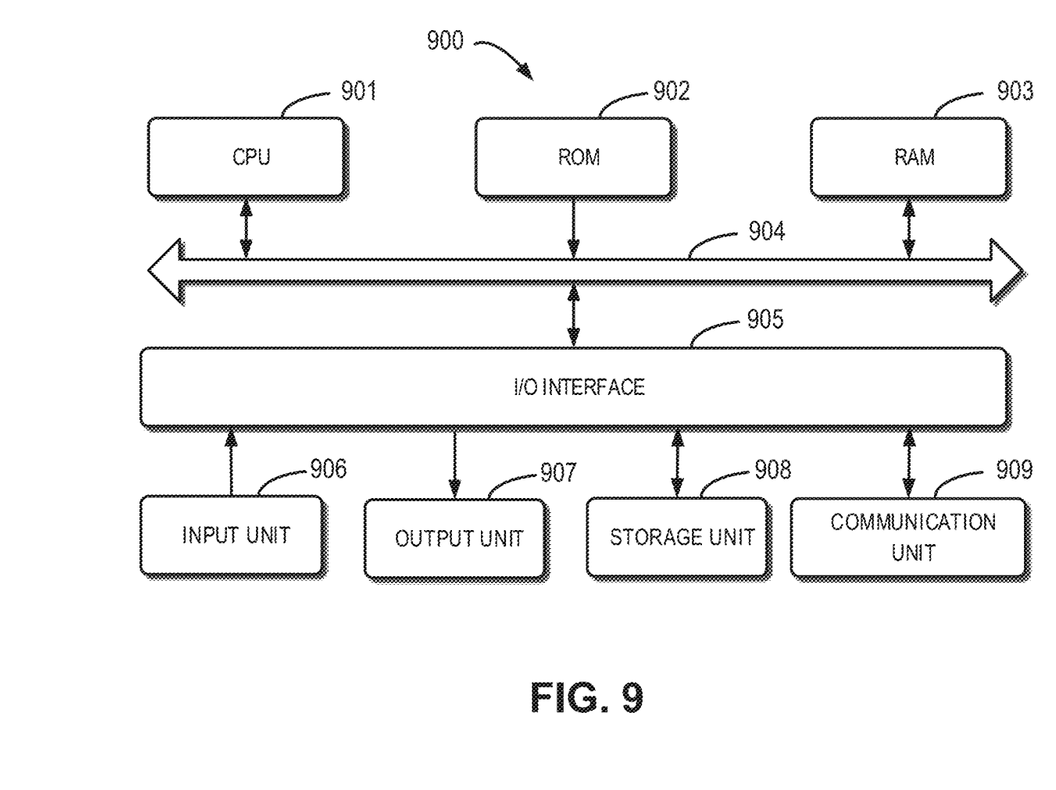
FIG. 9 shows a schematic block diagram of an example device 900 which is applicable to implement embodiments of the present disclosure.

FIG. 9 shows a schematic block diagram of an example device 900 suitable for implementing embodiments of the present disclosure. As depicted, the device 900 comprises a central processing unit (CPU) 901 which is capable of performing various appropriate actions and processes in accordance with computer program instructions stored in a read only memory (ROM) 902 or computer program instructions loaded from a storage unit 908 to a random access memory (RAM) 903. In the RAM 903, there are also stored various programs and data required by the device 900 when operating. The CPU 901, the ROM 902 and the RAM 903 are connected to one another via a bus 904. An input/output (I/O) interface 905 is also connected to the bus 904.

Multiple components in the device 900 are connected to the I/O interface 905: an input unit 906 including a keyboard, a mouse, or the like; an output unit 907, such as various types of displays, a loudspeaker or the like; a storage unit 908, such as a disk, an optical disk or the like; and a communication unit 909, such as a LAN card, a modem, a wireless communication transceiver or the like. The communication unit 909 allows the device 900 to exchange information/data with other devices via a computer network, such as the Internet, and/or various telecommunication networks.

The above-described procedures and processes, such as the methods 500, 600 and 700 may be executed by the processing unit 901. For example, in some embodiments, the methods 500, 600 and 700 may be implemented as a computer software program, which is tangibly embodied on a machine readable medium, e.g. the storage unit 908. In some embodiments, part or the entirety of the computer program may be loaded to and/or installed on the device 900 via the ROM 902 and/or the communication unit 909. The computer program, when loaded to the RAM 903 and executed by the CPU 901, may execute one or more acts of the methods 500 and 600 as described above.

The present disclosure can be a method, a device and/or a computer program product. The computer program product can include a computer-readable storage medium, on which the computer-readable program instructions for executing various aspects of the present disclosure are loaded.

The computer readable storage medium can be a tangible device that can retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination thereof. More specific examples (a non-exhaustive list) of the computer readable storage medium would include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination thereof. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or downloaded to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, by means of state information of the computer readable program instructions, an electronic circuitry including, for example, programmable logic circuitry, field-programmable gate arrays (FPGA), or programmable logic arrays (PLA) can be personalized to execute the computer readable program instructions, thereby implementing various aspects of the present disclosure.

Aspects of the present disclosure are described herein with reference to flowchart and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which are executed on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of codes, which comprises one or more executable instructions for implementing the specified logical function(s). In some alternative implementations, the functions noted in the block may be implemented in an order different from those illustrated in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

The descriptions of the various embodiments of the present disclosure have been presented for illustration purposes, but are not intended to be exhaustive or limited to the embodiments disclosed. Many modifications and variations will be apparent to those of skilled in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of negotiating coherency of transactions in a distributed network, comprising:
receiving, from a server of a first application node by a network adapter of the first application node, entity information comprising an indication of at least one entity with which coherency of transactions is to be negotiated between application nodes of a distributed application;
identifying, by the network adapter, a second application node based at least in part on the entity information;
receiving, by the network adapter, a negotiation request for a transaction associated with the distributed application;
negotiating with the second application node, by a negotiation module of the network adapter, to obtain transaction negotiation information corresponding to the transaction, the transaction negotiation information comprising an indication that a coherent result of the distributed application associated with the transaction has been reached with the second application node, the coherent result of the distributed application comprising an acceptance by both the negotiation module of the network adapter and the second application node of the same result for the distributed application; and
sending, by the network adapter, the transaction negotiation information to the server of the first application node;
wherein the method is performed by at least one processing device of the network adapter of the first application node, the network adapter comprising the negotiation module.

2. The method of claim 1, further comprising:
determining status data related to the negotiation with the second application node; and
sending the status data to the server.

3. The method of claim 1, wherein receiving the negotiation request for the transaction comprises receiving the negotiation request from the server or receiving the negotiation request from the second application node.

4. The method of claim 1, further comprising:
determining that status data generated by the network adapter during the negotiation of the transaction and comprising information about the negotiation is not available on the network adapter;
based at least in part on the status data being unavailable, receiving, from the second application node, further status data corresponding to the unavailable status data; and
determining the unavailable status data based at least in part on the further status data.

5. A method of negotiating coherency of transactions in a distributed network, comprising:
sending entity information to a network adapter of a first application node, the network adapter comprising a negotiation module that is configured for negotiating coherency for transactions associated with a distributed application in the distributed network, the entity information comprising an indication of at least one entity with which coherency of transactions is to be negotiated between application nodes of the distributed application, the at least one entity comprising a second application node; and
receiving, from the network adapter, transaction negotiation information, the transaction negotiation information comprising an indication that a coherent result of the distributed application associated with a transaction has been reached by the negotiation module of the network adapter with the second application node, the coherent result of the distributed application comprising an acceptance by both the negotiation module of the network adapter and the second application node of the same result for the distributed application,
wherein the method is performed by at least one processing device of a server of the first application node.

6. The method of claim 5, further comprising:
receiving, from the network adapter, status data related to a negotiation of the transaction with the second application node that is determined by the network adapter.

7. The method of claim 5, further comprising:
sending a negotiation request for the transaction to the network adapter.

8. A device comprising a network adapter of a first application node, the network adapter comprising a negotiation module that is configured for negotiating coherency for transactions in a distributed network, the network adapter comprising:
at least one processing unit;
at least one memory, coupled to the at least one processing unit and storing instructions executed by the at least one processing unit, the instructions, when executed by the at least one processing unit, causing the network adapter to perform acts, including:
receiving, from a server of the first application node, entity information comprising an indication of at least one entity with which coherency of transactions is to be negotiated between application nodes of a distributed application;
identifying a second application node based at least in part on the entity information;
receiving a negotiation request for a transaction associated with the distributed application;
negotiating with the second application node, by the negotiation module of the network adapter, to obtain transaction negotiation information corresponding to the transaction, the transaction negotiation information comprising an indication that a coherent result of the distributed application associated with the transaction has been reached with the second application node, the coherent result comprising an acceptance by both the negotiation module of the network adapter and the second application node of the same result for the distributed application; and
sending the transaction negotiation information to the server of the first application node.

9. The device of claim 8, wherein the acts further comprise:
determining status data related to the negotiation with the second application node; and
sending the status data to the server.

10. The device of claim 8, wherein receiving the negotiation request for the transaction comprises receiving the negotiation request from the server or receiving the negotiation request from the second application node.

11. The device of claim 8, wherein the acts further comprise:
determining that status data generated by the network adapter during the negotiation of the transaction and comprising information about the negotiation is not available on the network adapter;
based at least in part on the status data being unavailable, receiving, from the second application node, further status data corresponding to the unavailable status data; and
determining the unavailable status data based at least in part on the further status data.

12. A computer program product, tangibly stored on a non-transient computer readable medium and comprising machine executable instructions which, when executed, cause the machine to execute steps of a method according to claim 1.

13. A computer program product, tangibly stored on a non-transient computer readable medium and comprising machine executable instructions which, when executed, cause the machine to execute steps of a method according to claim 5.

14. The method of claim 2, wherein:
the network adapter comprises volatile storage media, the status data being stored in the volatile storage media on the network adapter;
the server comprises non-volatile storage media; and
sending the status data to the server comprises obtaining the status data from the volatile storage media of the network adapter and sending the obtained status data to the server to persist the data in the non-volatile storage media.

15. The method of claim 14, wherein in conjunction with a restart of the network adapter, the method further comprises receiving the status data stored in the non-volatile storage media of the server and storing the received status data in the volatile storage media of the network adapter.

16. The method of claim 6, wherein:
the network adapter comprises volatile storage media, the status data being stored in the volatile storage media on the network adapter;
the server comprises non-volatile storage media; and
sending the status data to the server comprises obtaining the status data from the volatile storage media of the network adapter and sending the obtained status data to the server to persist the status data in the non-volatile storage media.

17. The device of claim 9, wherein:
the network adapter comprises volatile storage media, the status data being stored in the volatile storage media on the network adapter;
the server comprises non-volatile storage media; and
sending the status data to the server comprises obtaining the status data from the volatile storage media of the network adapter and sending the obtained status data to the server to persist the status data in the non-volatile storage media.

18. The method of claim 1, wherein:
the network adapter is configured to monitor a predefined port of the network adapter for incoming communications from the server of the first application node; and
receiving the entity information from the server comprises monitoring the predefined port for a communication from the server that comprises the entity information.

19. The method of claim 5, wherein:
the network adapter is configured to monitor a predefined port of the network adapter for incoming communications from the server of the first application node; and
sending the entity information to the network adapter comprises sending a communication comprising the entity information to the predefined port of the network adapter.

20. The device of claim 8, wherein:
the network adapter is configured to monitor a predefined port of the network adapter for incoming communications from the server of the first application node; and
receiving the entity information from the server comprises monitoring the predefined port for a communication from the server that comprises the entity information.

* * * * *